US010008100B2

(12) United States Patent
Gitau

(10) Patent No.: US 10,008,100 B2
(45) Date of Patent: Jun. 26, 2018

(54) COORDINATED COMMUNICATIONS IN EMERGENCY

(71) Applicant: Miriam Gitau, Acworth, GA (US)

(72) Inventor: Miriam Gitau, Acworth, GA (US)

(*) Notice: Subject to any disclaimer, the term of this patent is extended or adjusted under 35 U.S.C. 154(b) by 0 days. days.

(21) Appl. No.: 14/219,578

(22) Filed: Mar. 19, 2014

(65) Prior Publication Data

US 2014/0285341 A1 Sep. 25, 2014

Related U.S. Application Data

(60) Provisional application No. 61/803,445, filed on Mar. 19, 2013.

(51) Int. Cl.
*G08B 3/10* (2006.01)
*H04M 11/04* (2006.01)
*G08B 25/00* (2006.01)

(52) U.S. Cl.
CPC ......... *G08B 25/009* (2013.01); *G08B 25/005* (2013.01)

(58) Field of Classification Search
CPC combination set(s) only.
See application file for complete search history.

(56) References Cited

U.S. PATENT DOCUMENTS 5,594,786 A * 1/1997 Chaco .................. G06F 19/327 128/904
5,661,492 A 8/1997 Shoap
6,529,164 B1 3/2003 Carter
7,312,752 B2 12/2007 Smith
8,208,891 B2 6/2012 Jacobs
8,254,848 B1 8/2012 Elliott
8,265,587 B2 9/2012 D'Evelyn
8,294,566 B2 10/2012 Morwood
8,320,874 B2 11/2012 Mills
8,401,514 B2 3/2013 Ebdon
8,422,986 B1 4/2013 Martin
2004/0192353 A1* 9/2004 Mason .................. G01S 5/0027 455/457
2005/0275528 A1* 12/2005 Kates ........................ 340/539.22
2006/0033619 A1* 2/2006 Sloan .................... G06F 19/327 340/568.1
2006/0035622 A1* 2/2006 Kampel ............... A63B 29/021 455/404.2
2006/0248221 A1* 11/2006 Hottel ..................... H04L 12/10 709/238
2011/0255454 A1 10/2011 Hauser
2013/0052982 A1 2/2013 Rohde

* cited by examiner

*Primary Examiner* — Brian Zimmerman
*Assistant Examiner* — Cal Eustaquio
(74) *Attorney, Agent, or Firm* — Taylor English Duma LLP

(57) ABSTRACT

A system is provided for coordinated communication between various campus personnel and administrators, so that timely responses and effective actions are taken during times of emergency to provide reduced risk of injury or death to persons affected by the emergency is provided. The coordinated communication system includes a group of communication alert devices and at least one administrator alert device for sending and receiving alert indicators throughout a campus or location.

20 Claims, 8 Drawing Sheets

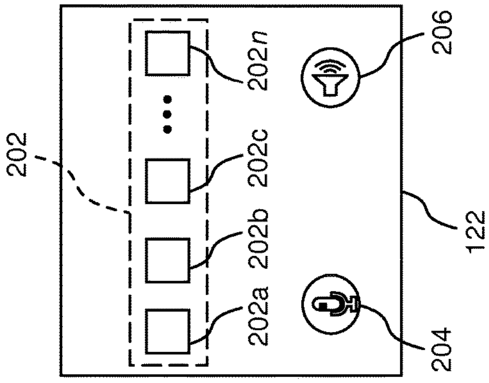
Fig. 2-A
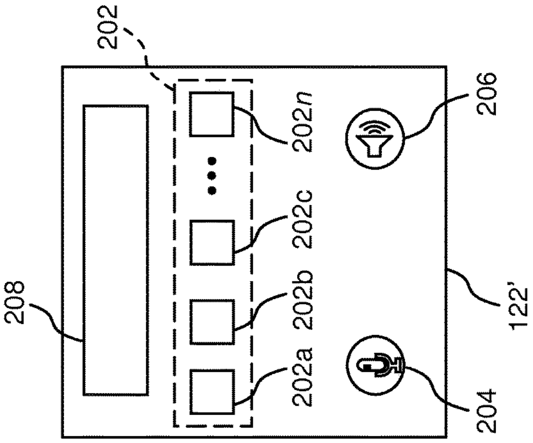
Fig. 2-B
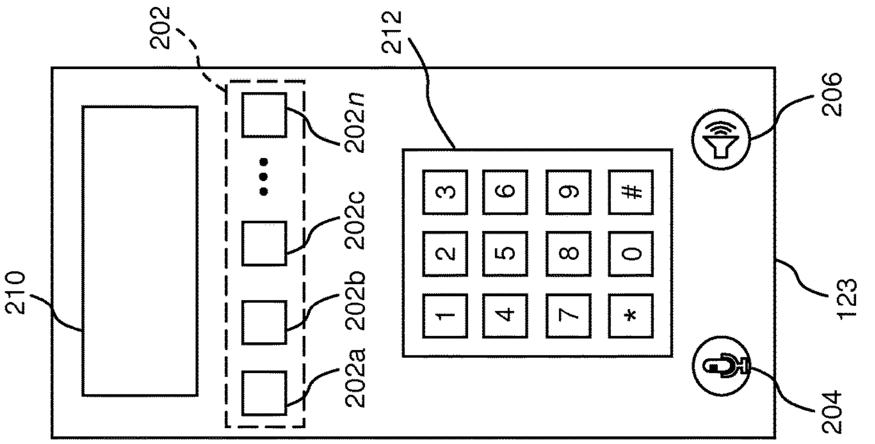
Fig. 2-C

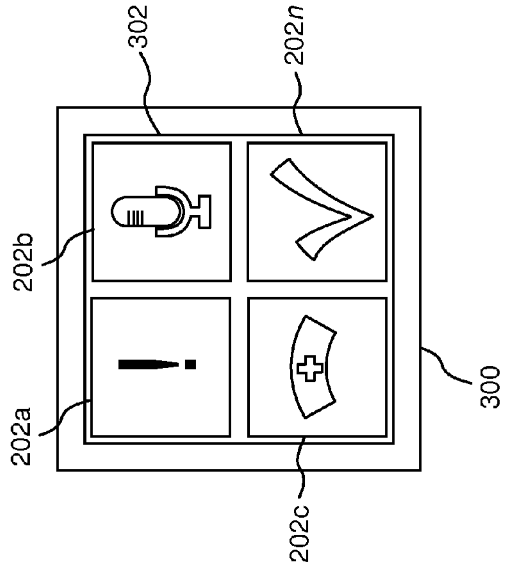
Fig. 3-A
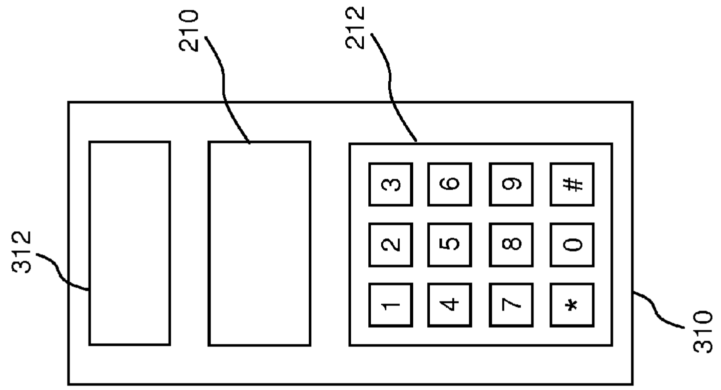
Fig. 3-B

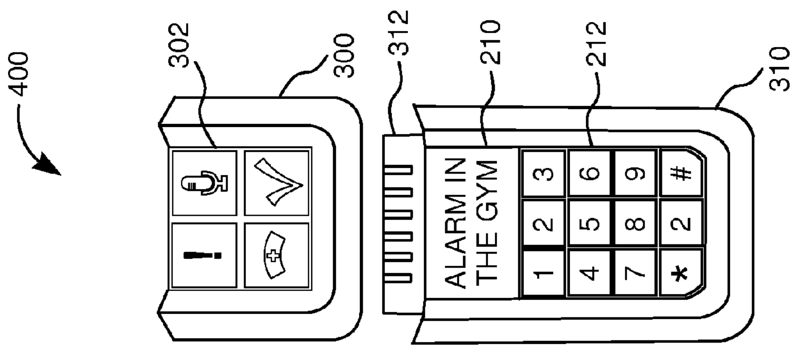
Fig. 4-A
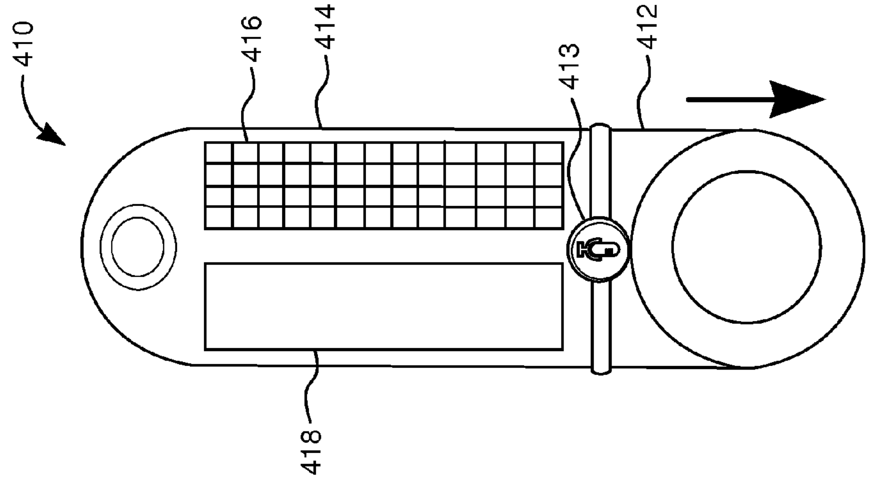
Fig. 4-B
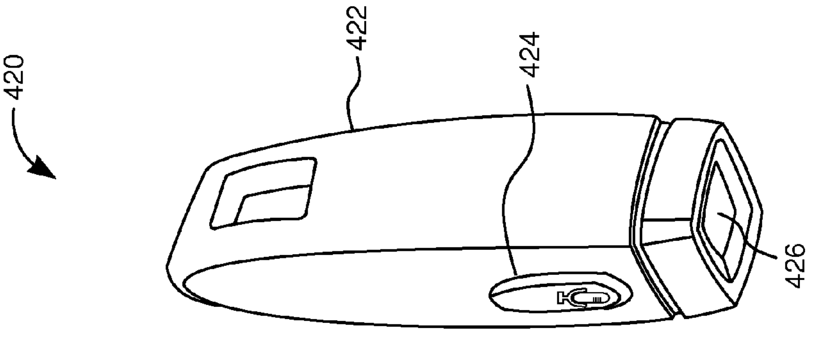
Fig. 4-C

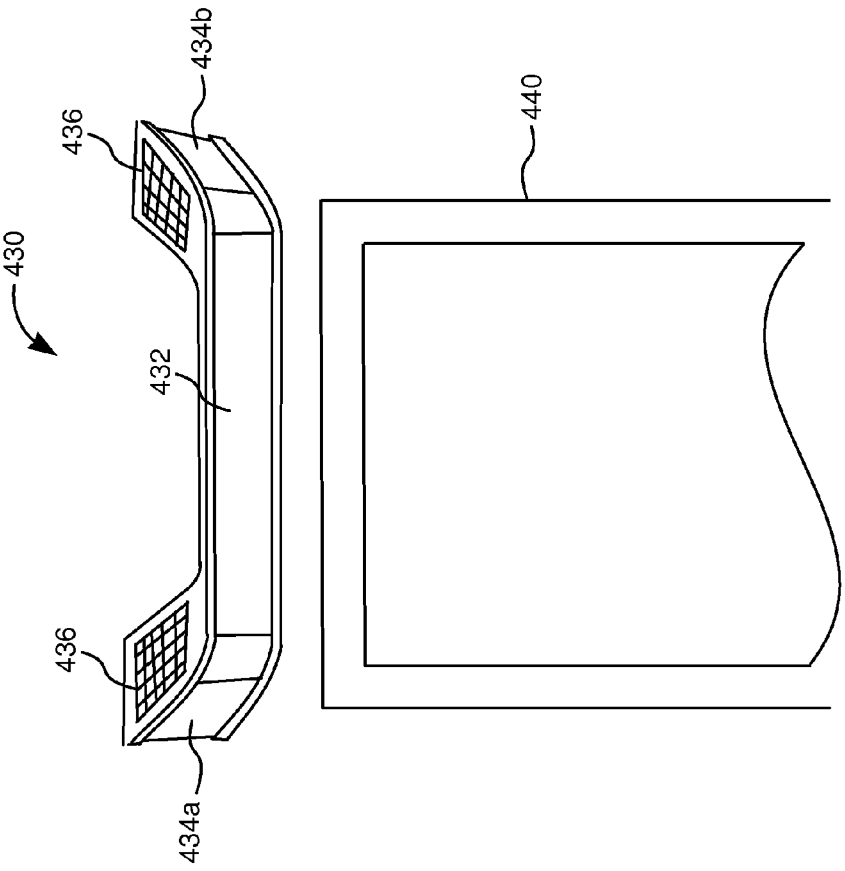
Fig. 4-D

COORDINATED COMMUNICATIONS IN EMERGENCY

CROSS-REFERENCE TO RELATED APPLICATIONS

This application claims the benefit of U.S. Provisional Application No. 61/803,445, entitled "Coordinated Communications in Emergency," filed Mar. 19, 2013, which is incorporated herein by reference as if set forth herein in its entirety.

BACKGROUND

Emergency situations on campus are a major concern at elementary, middle, or high schools, as well as on the college campus, and extending into life away from campus at malls, theaters, or even the office. When a dangerous situation erupts, it is often the case that the personnel involved are not always certain how to respond, whether they be teachers, children, office workers, or mall security. Further, there are different responses for different situations. However, it is often the case during emergency that while people are aware that a dangerous situation exists they may have no way to know what that situation is. Further if they are unaware that a threatening or dangerous situation is present they may inadvertently end up in the middle of the threat when simple awareness could have prevented such an occurrence.

Many schools, for example, have emergency procedures in place to provide for lockdown and other security measures in an attempt to minimize injury or worse. Even in those situations like the recent shooting at an elementary school in Connecticut, where emergency procedures were in place, the principal of the school was one of the early casualties, which prevented the procedures from being fully implemented and followed.

In the event of an emergency or other serious situation, a school staff member should be able to quickly and efficiently convey an alert as soon as possible. If an incident that requires alert is observed in a hallway, cafeteria, gym, or playground, the observer often must scream or quickly get to an office to alert others of the danger, for example. Current methods of declaring a "Code Red" situation are lacking in that many situations can get much worse very quickly before an alert to the situation is communicated.

Emergency procedures that are heavily dependent on a single point of control, a reduced number of authority figures, or limited access to the communication channels leave a gap in the ability to protect or warn others of impending dangers. Improved communication and coordination is one way to minimize risk during threatening, dangerous, and/or deadly situations that arise.

It is with respect to these and other considerations that the disclosure made herein is presented.

BRIEF SUMMARY

According to one embodiment of the present invention, a system is provided for coordinated communication between various campus personnel and administrators, so that timely responses and effective actions are taken during times of emergency to reduce risk of injury or death to persons affected by the emergency.

The coordinated communication system includes at least one server, a network, wireless access points (WAP), a group of communication alert devices, and at least one administrator alert device.

The network includes intranets, extranets, wide area networks (WANs), local area networks (LANs), wired networks, wireless networks, Bluetooth, or any suitable combination of such networks. The communication alert devices are small, electronic, wireless devices that are worn or secured to a person and are similar to a bracelet, pendant, mobile phone, and other similar sized devices that can be worn or attached to a person such as with a belt hook or a necklace, for example. The communication alert devices are operable for sending and receiving alerts to or from an administrator or central authority when observing a threatening, dangerous, or even deadly situation. Such threatening situations may include injured people, a fire, a hazardous leak, a stranger on campus acting suspiciously, or a person with a gun.

The communication alert devices include functionality for sending and receiving transmissions that cause activation of an indicator identifying the present status or the newly activated status. In one embodiment, the indicator is a red light that signifies a code red for a serious situation that could be an imminent danger, threat, or even life threatening condition. An activated orange light indicates a voice communication with an administrator. An activated blue light indicates that a nurse has been requested due to sickness or injury for example. Finally, an activated green light indicates an all clear condition in which there is no emergency or that the emergency has passed. In response to a particular indicator, the person in possession of the alert device can take appropriate action to secure the environment until the situation has passed. Once the emergency situation has been contained an administrator such as a principal uses an admin device to send an all clear (green) signal. Each alert device receives the all clear signal and resets the indicator to show only green. In this way the users of the alert devices know that the situation is under control and/or has returned to a safe and normal condition.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The above-mentioned features will become more clearly understood from the following detailed description read together with the drawings in which:

FIGS. 2-A, 2-B, and 2-C are illustrations depicting the capability and functionality of a communications alert device and administrative communications alert devices as used in FIG. 1;

FIGS. 3-A and 3-B are illustrations depicting the capability and functionality of an alternative communications alert device and an alternative administrative communications alert device;

FIGS. 4-A, 4-B, and 4-C are illustrations depicting various communications alert devices;

FIG. 4-D is an illustration depicting an alert indicator;

DETAILED DESCRIPTION

The following detailed description is directed to technologies for providing and managing communications between campus personnel during a crisis or emergency situation. Through implementation of the technologies disclosed herein, a coordinated communication system is provided between various campus personnel and administrators, so that timely responses and effective actions are taken during times of emergency to provide reduced risk of injury or death to persons affected by the emergency.

Figure 1:
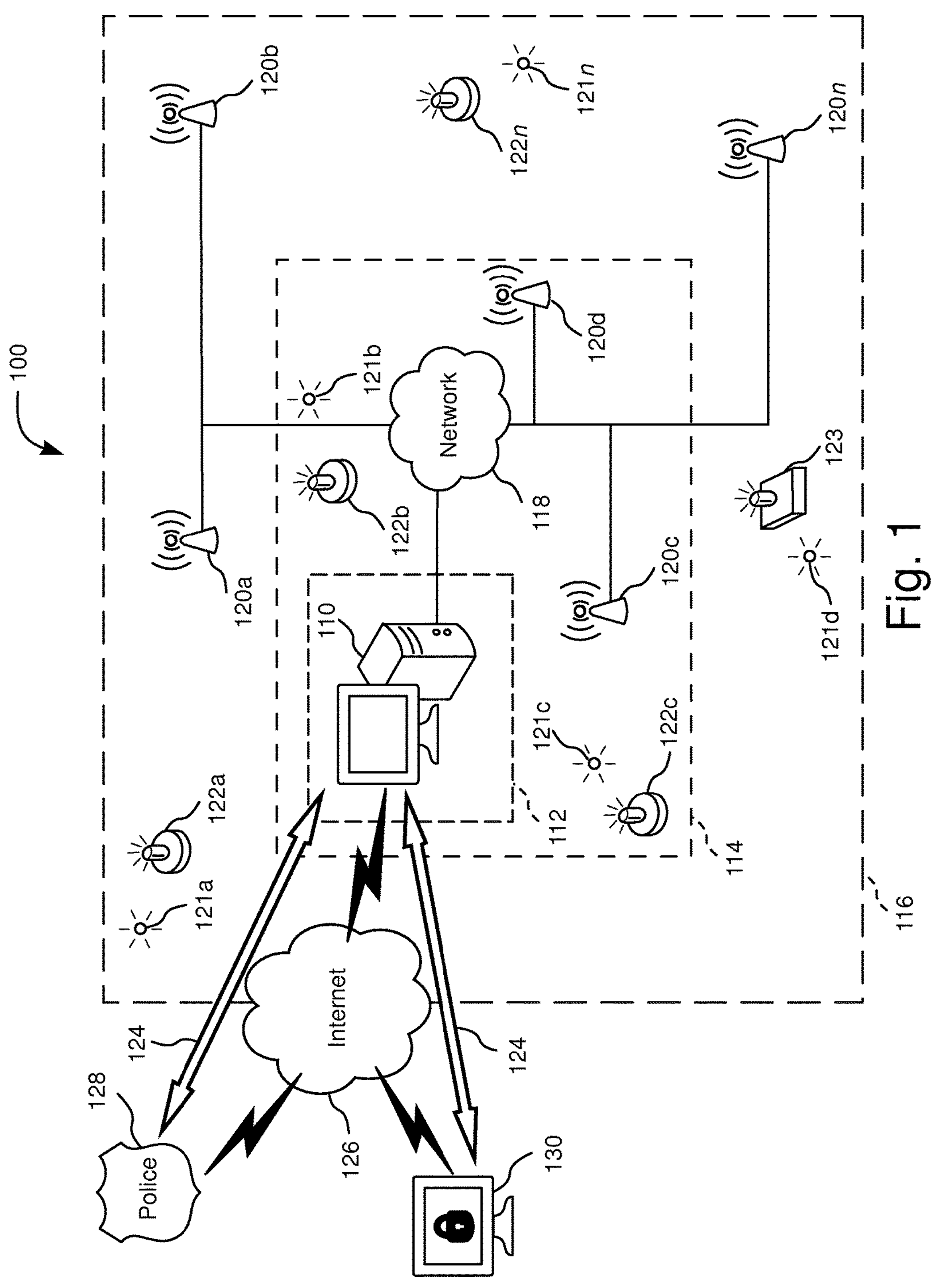
FIG. 1 is a system diagram illustrating a coordinated communication system for use in emergency situations.

FIG. 1 is a diagram illustrating a coordinated communication system 100 for providing timely and effective responses during emergency situations, in a school or campus environment for example. The coordinated communication system 100 includes at least one server 110, a network 118, wireless access points (WAP) 120*a*, 120*b*, 120*c*, 120*d*, 120*n* (collectively 120), indicators 121*a*, 121*b*, 121*c*, 121*d*, 121*n*, (collectively 121), a group of communication alert devices (alert devices) 122*a*, 122*b*, 122*c*, 122*n* (collectively 122), and at least one administrator alert device (admin device) 123.

The network 118 includes, for example, intranets, extranets, wide area networks (WANs), local area networks (LANs), wired networks, wireless networks, Bluetooth, or any suitable combination of such networks and configurations as are commonly utilized in such an environment. The WAPs 120 provide access to the network through communication protocols suitable for such networks. In one embodiment, the WAPs 120 include Bluetooth capability for providing access to the network via the communication alert devices 122.

The communication alert devices 122 are small, electronic, wireless devices that are worn or secured to a person and are similar to a bracelet, pendant, mobile phone, and other similar sized devices that can be worn or attached to a person such as with a belt hook or a necklace, for example. The alert devices 122 are utilized to send and receive alerts to or from an administrator or central authority when a person in possession of an alert device 122 observes a threatening, dangerous, or even deadly situation. Such threatening situations might include one or more injured people, a fire, a hazardous leak, a stranger(s) on campus acting suspiciously, or a person with a gun, among many others. The type of situations which are difficult to anticipate or predict can still be accounted for by at least making others aware that something is seriously amiss. Those skilled in the art will readily appreciate that the coordinated communication system 100 also provides for effective emergency communications in other environments, such as universities, hospitals, government installations, malls, theaters, and even business locations.

The system 100 illustrated in FIG. 1 describes an exemplary school campus 116 that includes a building 114 and a central authority or monitoring station 112. The monitoring station 112 includes a server 110 for hosting communications with the alert devices 122. Of course the system 100 can and typically does include more than one server 110 and/or other computers for execution of any programs or other functionality involved with operation of the system 100. The server 110 is connected via a localized network environment (network) 118 to various WAPs 120 located throughout the building and/or campus. The WAPs 120 and other network 118 connections are located in a strategic manner that provides for continuous access to the network 118. The geographical range of the network 118 is limited only by the range of the WAPs 120 in concert with the alert devices 122.

The server 110 also has access beyond the system 100 through the Internet 126 and also through one or more virtual private networks (VPN) 124. A typical VPN 124 provides a secure communication to connect computerized devices through the Internet 126. In the illustrated embodiment, the system 100 is connectable to other such systems 100 that exist, for example, in multiple schools within a district or county. That is, multiple schools within a district each have a system 100 installed and are each available and/or provide information to the district. A similar installation might also be coordinated at the county level, for example. Additionally, the system 100 is connectable via a VPN 124 to other parties such as a government agency or private entity, among others. As illustrated in FIG. 1, one or more VPNs 124 provides a network connection between the system 100 and a law enforcement office 128 and/or between the system 100 and a company or agency providing security service 130.

The communication alert devices 122 and the administrator devices 123, discussed in further detail below, provide functionality for sending and receiving transmissions that activate an indicator to show the current or the newly activated status. In one embodiment, the indicators 121 are color coded lights to signify the present status or a newly activated status. In such an embodiment, for example, an activated red light indicates a code red for a serious situation that could be an imminent danger, threat, or even life threatening condition. An activated orange light indicates that the voice communication of the alert device 122 has been activated for communication with an administrator having an admin device 123 or alternatively with someone at the monitoring station 112. In one embodiment, any voice communications are recorded and saved at a server 110 in the monitoring station 112. An activated blue light indicates that a nurse has been requested due to sickness or injury for example. Finally, an activated green light indicates an all clear condition in which there is no emergency or that the emergency has passed. In response to a particular color coded light signal, the person in possession of the alert device 122 can take appropriate action to secure the environment until the situation has passed. Once the emergency situation has been contained, an administrator such as a principal uses an admin device 123 to send an all clear (green) signal. Each alert device 122 receives the all clear signal and resets the color coded light to show only green. In this way the users of the alert devices 122 (teachers) know that the situation has returned to a safe and normal condition.

Corresponding generally to the alert devices 122 and the admin devices 123 are indicators 121 located at strategic points within the facility and optionally on the campus as well. In one embodiment, the indicators 121 are battery operated Bluetooth lights. In one embodiment, indicators 121 are located strategically at doors, for example. Operation of the alert devices 122 and admin devices 123 causes activation or illumination of the indicators 121 according to the particular functionality selected.

The coordinated communication system 100 provides smooth and timely communications and enhances the effectiveness of rescue missions, leading to prevention of additional loss of life in severe emergency situations. The system 100 has utility for learning institutions and is particularly effective for use in public and private schools including preschools, elementary schools, middle schools, high schools, as well as colleges and universities. Embassies and consulates that are common targets for terrorists where smooth, timely and efficient communications often save lives can benefit from immediate communication of the danger.

Critical business and government installations can also benefit from the system 100. Dangerous environments such as refineries and power plants, for example, would benefit from early notification of a serious situation so that workers do not have to wait until an explosion, or severe exposure to a gas leak before taking action. One recent incident where hostages were taken by terrorists that took over a facility in Algeria could possibly have benefitted from the system 100 as people would have been made aware of the situation at the first sign of trouble instead of finding out when they were captured. A lock-down of the facility might have allowed some to reach secure locations inaccessible to the intruders.

Military bases and installations, as well as oil and gas industry locations could benefit from the system 100 as well. Mining operations are another use where the system 100 can save lives as dangerous situations occur more often than in many industries. The system 100 provides for early alert that can mean the difference in whether workers can reach appropriate safety areas in time to spare their lives from a deadly situation.

Private businesses such as malls can benefit from the system by providing alert devices 122 to shop operators, employees, security guards and the like. A central monitoring console can be co-located with surveillance monitors. Similarly, hospitals can provide the system 100 so that all employees have an alert device 122 to provide early warning of a dangerous situation.

Other industries that could benefit from the system 100 include hotels and restaurants, spas, and recreational and fitness facilities.

The system 100 has the potential for integration with emergency services such as 911. Further, the system 100 has similar potential for integration with school district monitoring and/or security services. Such a capability could be critical in the event, for example, of multiple sites being targeted at or about the same time.

Along with the capability for providing network connection and VPN capability to external security services, the system 100 also provides capability for access control. For example, the alert devices 122 and the admin devices 123 are also capable of providing wireless key functionality. That is, if the facility has access control capability, then the alert devices 122 and admin devices 123 of the system 100 are configurable to integrate with an access control system to provide for admission to the facility. For example, a staff ID and/or electronic photo may be incorporated into and/or operate in concert with the alert devices 122 and admin devices 123. Similarly, in an embodiment where access control is incorporated, certain alert devices 122 and admin devices 123 provide access to specified locations while denying access to other locations.

The system 100 is also configurable for operability with surveillance systems. In one embodiment, the alert devices 122 are configured to trigger an alert upon detected motion in prescribed areas of a facility. Of course, such capability also provides for detecting motion only during certain time periods.

FIG. 2-A is an illustration depicting the capability and functionality of one embodiment of an alert device 122 for use within the system 100. The alert device 122 is an electronic device operationally similar to a mobile phone, for example, and having capability to send and receive communications transmissions via wireless protocols including IEEE 802.11b/g/n and Bluetooth, among others. Each alert device 122 is uniquely identified within the system. The alert devices 122 also include Global Positioning System (GPS) capability for providing accurate location of the alert device 122 to the monitoring station 112. That is upon activating a selectable alert indicator 202, the alert device 122 sends a message to the monitoring station 112 and to the admin devices 123 identifying the sender of the alert and the location from which the alert was sent.

One embodiment of the alert device 122 includes a plurality of selectable alert indicators 202*a*, 202*b*, 202*c*, 202*n*, a microphone 204, and a speaker 206. In FIG. 2-A, and throughout the remainder of this disclosure, the selectable alert indicators are referenced interchangeably as selectable alert indicators 202*a*, 202*b*, 202*c*, 202*n*, or selectable alert indicators 202 (referencing a particular grouping) and as selectable alert indicator 202 for any particular selectable alert indicator. The alert device 122 also includes processing capability for sending and receiving communication signals and messages, as well as GPS functionality and operation of the microphone 204, speaker 206, and selectable alert indicators 202. In the illustrated embodiment, the selectable alert indicators 202 include inputs 202*a*, 202*b*, 202*c*, 202*n* that are also illuminated to indicate a color when the particular selectable alert indicator 202 is selected, that is, to function as a lighted alert indication. One embodiment includes four selectable alert indicators 202 where each is a color coded button/light combination such as "red," "orange," "blue," and "green."

In one embodiment, the selectable alert indicators 202 are buttons that illuminate when pressed by a user. Pressing a button activates the illumination function of the selectable alert indicator 202. Upon a user pressing a button, a processor within the alert device 122 initiates a process by which an alert signal is transmitted to the monitoring station and also to other alert devices 122 and admin devices 123 within the system 100. In other embodiments, pressing a button or initiation of some other type input activates a single selectable alert indicator 202 that changes due to the particular input received.

The alert device 122 also receives signals that are sent by an admin device 123 or a monitoring station 112. When an alert signal is received, the alert device 122 vibrates and activates the appropriate selectable alert indicator 202. The user or teacher then takes an appropriate action based on the response that is necessary for the indicated code.

In one embodiment, the alert device 122 and the admin device 123 include capability for providing status information to the monitoring station 112. Such status information includes indications for (1) not functioning properly, (2) low battery, (3) device not being worn, and (4) location information. In such an embodiment, the alert device 122 or admin device 123 includes a sensor for detecting the presence of a person within a specified range of the device.

Further operation and use of the alert device 122 is provided below.

FIG. 2-B is an illustration depicting the capability and functionality of an alternative embodiment of an alert device 122' for use within the system 100. As above, the alert device 122' is an electronic device operationally similar to a mobile phone and having capability to send and receive communications transmissions via wireless protocols including IEEE 802.11b/g/n and Bluetooth, among others. Each alert device 122' is uniquely identified within the system. As noted above, the alert device 122' also includes Global Positioning System (GPS) capability for providing accurate location of the alert device 122' to the monitoring station 112. The alternative alert device 122' also includes a text module 208 for receiving short text messages.

Since each alert device 122' is uniquely identifiable, the alert device 122' receives short text message that, for example, provide further clarification of the condition indicated by the selectable alert indicators 202 or merely that notify the recipient of a request without interrupting others. For example, schools that utilize a PA system to request some action from a teacher, or to notify the teacher that a parent has arrived to pick up a child early for a doctor's appointment, for example, necessarily interrupts the class when the PA system is used. For a school wide request (the teacher is away from her normal location and must be reached with the message), the entire school is disrupted by the PA usage. A text message to the alert device 122' delivers the message or request while interrupting only the person receiving the text message.

Aside from the text module 208, the alternative alert device 122' operates as the alert device 122. Further operation and use of the alert device 122' is provided below.

FIG. 2-C is an illustration depicting the functionality of an administrative communications alert device (admin device) 123. As with the alert device 122 above, the admin device 123 is an electronic device operationally similar to a mobile phone, for example, and having capability to send and receive communications transmissions via wireless protocols including IEEE 802.11b/g/n and Bluetooth, among others. The admin device 123 also includes Global Positioning System (GPS) capability for providing accurate location of the admin device 123 to the monitoring station 112. That is, upon activating a selectable alert indicator 202, the admin device 123 sends a message to the monitoring station 112 identifying the sender of the alert and the location from which the alert was sent.

One embodiment of the admin device 123 includes a plurality of selectable alert indicators 202, a screen module 210 (and corresponding screen display), a keypad 212, a microphone 204, and a speaker 206. The admin device 123 includes processing capability for sending and receiving communication signals and messages, sending text messages, GPS functionality, and operation of the microphone 204, speaker 206, and selectable alert indicators 202. The selectable alert indicators 202 include inputs 202*a*, 202*b*, 202*c*, 202*n* that are also illuminated to indicate a color when the particular selectable alert indicator 202 is selected, that is, to function as a lighted alert indication. One embodiment includes four selectable alert indicators 202 where each is a color coded button/light combination such as "red," "orange," "blue," and "green."

In one embodiment, the selectable alert indicators 202 are buttons that illuminate when pressed by an administrator. Pressing a button activates the illumination function of the selectable alert indicator 202. Upon an administrator pressing a button, a processor within the admin device 123 initiates a process by which an alert signal is transmitted to the monitoring station and also to other alert devices 122 and admin devices 123 within the system 100.

The admin device 123 also receives signals that are sent by an alert device 122 or admin device 123 or a monitoring station 112. When an alert signal is received, the admin device 123 vibrates and activates the appropriate selectable alert indicator 202. The administrator then takes an appropriate action based on the response that is necessary for the indicated code.

Further operation and use of the admin device 123 is provided below.

FIGS. 3-A and 3-B are illustrations depicting the capability and functionality of an alternative communications alert device 300 (alert device 300) and an alternative administrative communications alert device 310 (admin device 310) for use within the system 100. The alternative communications alert device 300 is an electronic device operationally similar to a smart phone, for example, and having capability to send and receive communications transmissions via wireless protocols including IEEE 802.11b/g/n and Bluetooth, among others. The alert device 300 includes a tactile or touch screen 302 for receiving input and for displaying alert indications and other messages. Each alert device 300 is uniquely identified within the system. Each alert device 300 also includes Global Positioning System (GPS) capability for providing accurate location of the alert device 300 to the monitoring station 112. That is upon activating a selectable alert indicator via the touch screen 302, the alert device 300 sends a message to the monitoring station 112 and to the admin devices 123 identifying the sender of the alert and the location from which the alert was sent.

One embodiment of the alert device 300 receives input to select a particular selectable alert indicator 202 via the touch screen interface. The alert device 300 also includes a microphone and a speaker (both not shown) as discussed above in regard to alert devices 122, for example. The alert device 300 also includes processing capability for sending and receiving communication signals and messages, as well as GPS functionality and operation of the microphone, speaker, and the selectable alert indicators 202. In the illustrated embodiment, the selectable alert indicators available via the touch screen 302 include inputs 202*a*, 202*b*, 202*c*, 202*n* that are also highlighted to indicate an icon identifying when the particular selectable alert indicator 202 is selected, that is, to function as an alert indication. One embodiment includes four selectable alert indicators 202 where each is icon indicating "code red," "code orange," "code blue," and "code green," as discussed above.

In one embodiment, selecting a particular selectable alert indicator 202 via the touch screen 302 activates or highlights the particular selectable alert indicator 202. Upon a user touching or swiping the particular selectable alert indicator 202, a processor within the alert device 300 initiates a process by which an alert signal is transmitted to the monitoring station and also to other alert devices 300 and admin devices 310 within the system 100.

The alert device 300 also receives signals that are sent by an admin device 310 or a monitoring station 112. When an alert signal is received, the alert device 300 vibrates and activates the appropriate selectable alert indicator 202 on the touch screen 302. The user or teacher then takes an appropriate action based on the response that is necessary for the indicated code.

In one embodiment, the alert device 300 and the admin device 310 include capability for providing status information to the monitoring station 112. Such status information includes indications for (1) not functioning properly, (2) low battery, (3) device not being worn, and (4) location information. In such an embodiment, the alert device 300 or admin device 310 includes a sensor for detecting the presence of a person within a specified range of the device.

The admin device 310 is a module that operates in conjunction with an alert device 300. In the illustrated embodiment, the admin device 310 includes an interface 312 that provides for connecting or plugging the admin device 310 to the alert device 300. Together with the alert device 300, the admin device 310 is an electronic device operationally similar to a mobile phone, for example, and having capability to send and receive communications transmissions via wireless protocols including IEEE 802.11b/g/n and Bluetooth, among others. The admin device 123 also includes Global Positioning System (GPS) capability for providing accurate location of the admin device 310 to the monitoring station 112. That is, upon activating a selectable alert indicator 202, the admin device 310 sends a message to the monitoring station 112 identifying the sender of the alert and the location from which the alert was sent.

One embodiment of the admin device 310 includes a screen module 210 (and corresponding screen display), a keypad 212, as well as a microphone and speaker (not shown). The admin device also includes a touch screen 300 interface from the connected alert device 300. In one embodiment, the admin device 310 is an administration module connectable to an alert device 300 to provide administration alert device functionality. It should be noted that the keypad 212 can also be a qwerty type keyboard input.

The admin device 310 includes processing capability for sending and receiving communication signals and messages, sending text messages, GPS functionality, and operation of the microphone and speaker, and selectable alert indicators 202. In the illustrated embodiment, the selectable alert indicators available via the touch screen 302 include inputs 202*a*, 202*b*, 202*c*, 202*n* that are also highlighted to indicate an icon identifying when the particular selectable alert indicator 202 is selected, that is, to function as an alert indication. One embodiment includes four selectable alert indicators 202 where each is icon indicating "code red," "code orange," "code blue," and "code green," as discussed above.

In one embodiment, selecting a particular selectable alert indicator 202 via the touch screen 302 activates or highlights the particular selectable alert indicator 202. Upon a user touching or swiping the particular selectable alert indicator 202, a processor within the alert device 300 initiates a process by which an alert signal is transmitted to the monitoring station and also to other alert devices 300 and admin devices 310 within the system 100.

The admin device 310 also receives signals that are sent by alert devices 300, other admin devices 310, or monitoring stations 112. When an alert signal is received, the admin device 310 vibrates and activates the appropriate selectable alert indicator 202. The administrator then takes an appropriate action based on the response that is necessary for the indicated alert or code.

FIGS. 4-A, 4-B, and 4-C are illustrations depicting various type alternative communications alert devices 310, 410, 420. FIG. 4-A is an illustration depicting an touch screen type alert device 300 together with an associated admin device 310. The alert device 300 includes a touch screen 302 interface for receiving inputs related to status and or alert conditions and for displaying visual indications of alerts. The admin device 310 provides admin functionality and in conjunction with the alert device 300 provides an administration type alert device. The admin device 310 includes a keyboard input 212 and a display screen 210. Detailed functionality of the alert device 300 and the admin device 310 are provided above.

FIG. 4-B is an illustration of a pull-ring alert device 410. In various embodiments, the pull-ring alert device 410 includes a pull-ring alert indicator 412, a microphone 413, a base module 414, a qwerty keyboard 416, and a display screen 418. In lieu of a display screen, the base module 414 may include LEDs for providing indicators of each respective alert. Functionality of the respective components are similar to those described with respect to the above-described alert devices. The additional functionality added by the pull-ring alert device 410 is the ability to select an alert by simply removing the pull-ring alert indicator 412 from the base module 414. Otherwise, functionality is as described above.

FIG. 4-C is an illustration of a buzzer alert device 420. The buzzer alert device 420 includes a base module 422, a microphone 424, and a button 426. The base module 422 provides processing capability for sending and receiving signals as described above. The buzzer may optionally include alert lights along the base module 422. Selecting the microphone sends a code orange signal to an admin device 123, 310 and triggers microphone operation.

The button 426 is pressed to select a particular alert code. Multiple pressing of the button 426 will cycle through the available alert codes.

FIG. 4-D is an illustration depicting an alternative alert indicator 430. As noted above, a primary type alert indicator is one or more lights that are selectable or change color to indicate a particular code alert condition. The alternative alert indicator 430 shown includes an e-paper display 432, LED displays 434*a*, 434*b*, and solar panels 436 above a doorway 440.

An electronic paper or e-paper display 432 is a display technology that mimics the appearance of ink on paper. E-paper displays reflect light like ordinary paper, makes viewing more comfortable to read, and provides a wider viewing angle as compared to conventional display technologies. An ideal e-paper display can be read in direct sunlight without the image appearing to fade. In the illustrated embodiment, the e-paper display 432 uses no power except when being reprogrammed and also provides for ease in changing or providing additional information about the indicated alert status.

Traditional LED displays 434*a*, 434*b* are located on either end of the alternative alert indicator 430. The LED displays 434*a*, 434*b* are used to provide a color coded alert indication as above, while also providing flexibility for additional information related to a particular alert indication.

Solar panels 436 are also available to provide for the minimal power requirements of the alternative alert indicator 430.

Figure 5:
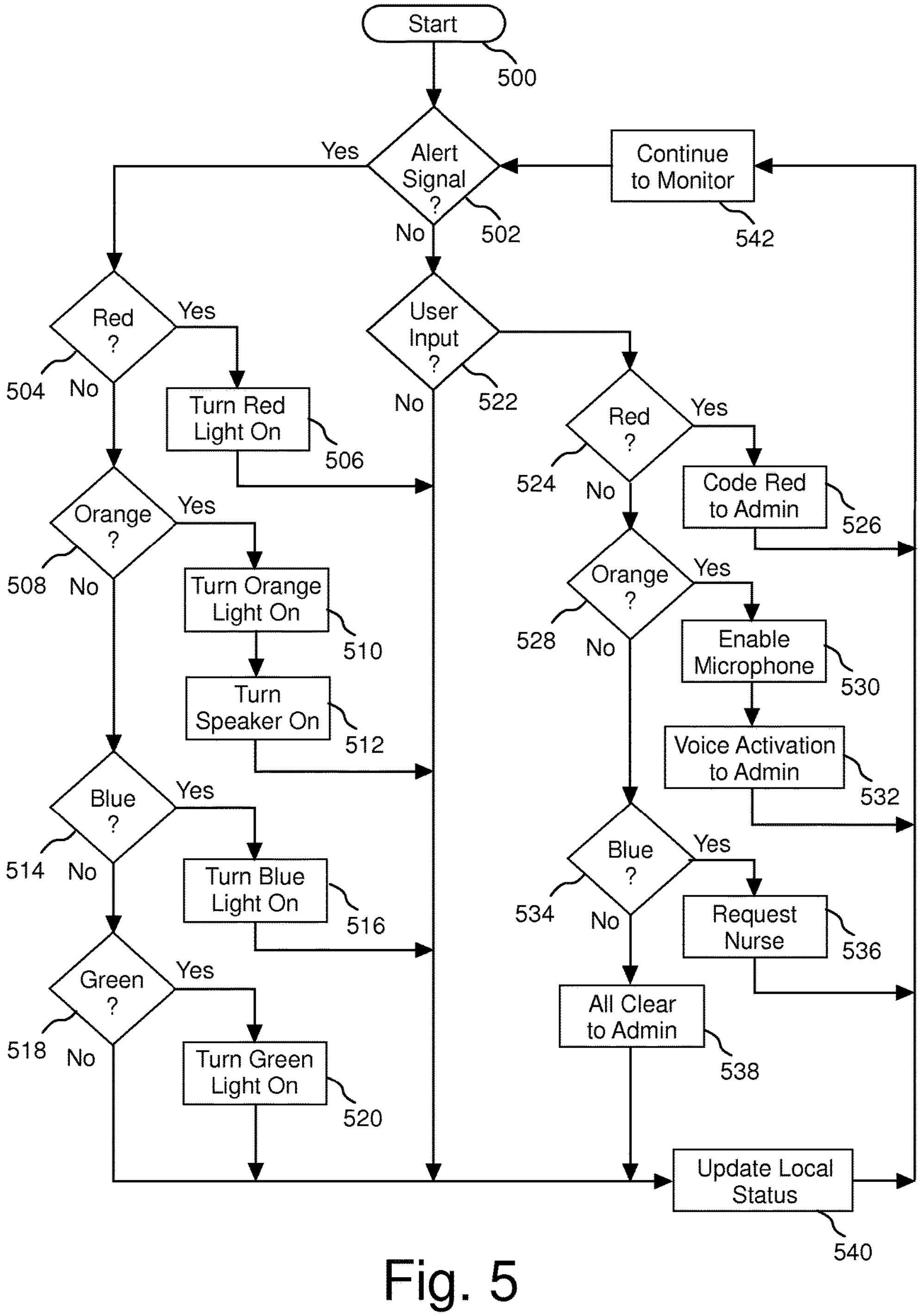
FIG. 5 is a flowchart depicting the operation of the communications alert device as in FIG. 2-A.
Figure 6:
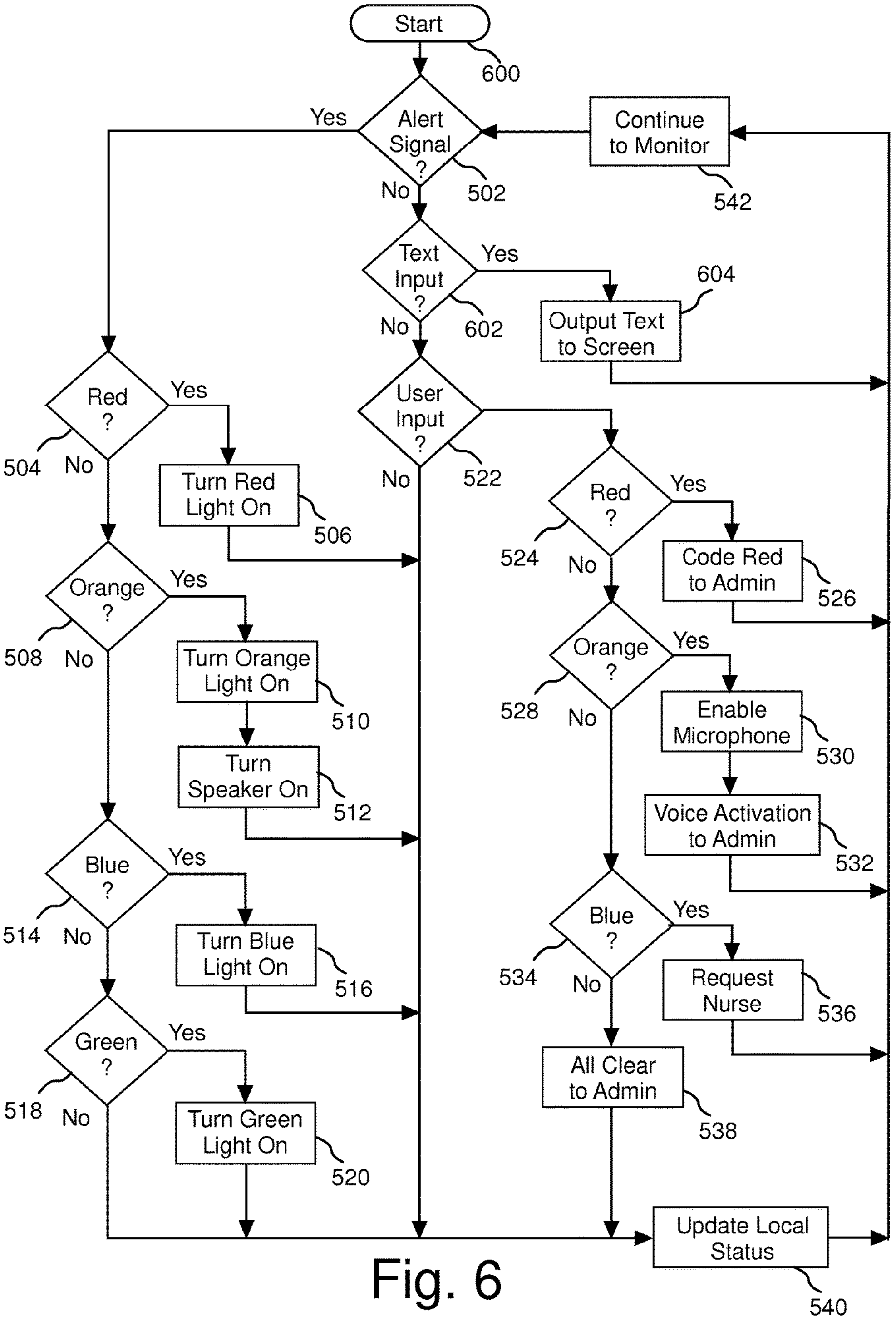
FIG. 6 is a flowchart depicting the operation of an alternative communications alert device as in FIG. 2-B.
Figure 7:
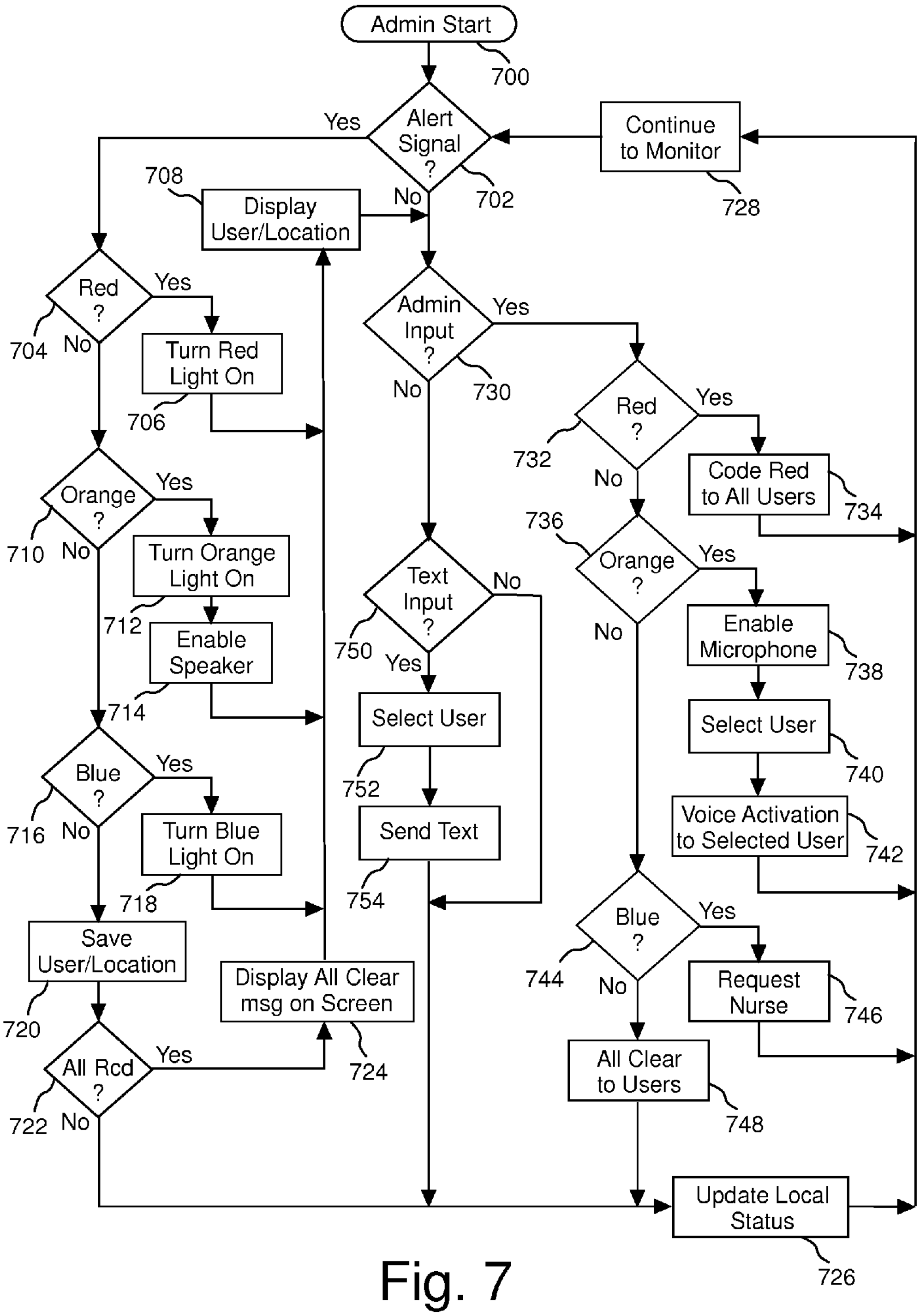
FIG. 7 is a flowchart depicting the operation of an administrative communications alert device as in FIG. 2-C.

FIG. 5, FIG. 6 and FIG. 7 provide exemplary functionality of the alert device 122, alert device 122' and admin device 123 described above. These are exemplary illustrations of use of the respective devices. Other functionality of each respective alert device described above are contemplated within this disclosure. Such uses as described within the written description are also contemplated within the use of the respective alert devices.

FIG. 5 is a flowchart 500 depicting one embodiment of the operation of the communications alert device 122. Operation initiates with a first step 502 checking for the detection or receipt of an alert signal which can originate with either a monitoring station 112 or an admin device 123.

If an alert signal is received, a determination is made at step 504 whether the alert signal indicates a CODE RED. If a CODE RED alert signal is received, the red light of the corresponding selectable alert indicator 202 is illuminated at step 506. At this point, any local status indicators outside the alert device 122 and within the system 100 are also handled at step 540. Such a local status indicator might include activating an alert indicator 121 at a classroom door to RED, or activating an alternative display at a classroom door, for example.

If the alert signal is not RED, a determination is made whether the alert code indicates ORANGE at step 508. If so, the corresponding selectable alert indicator 202 is illuminated at step 510. The speaker is turned on at step 512 so that the user hears the message from the monitoring station 112 or admin device 123. At this point, any local status indicators outside the alert device 122 and within the system 100 are also handled at step 540.

If the alert signal is not ORANGE, a determination is made whether the alert code indicates BLUE at step 514. If so, the corresponding selectable alert indicator 202 is illuminated at step 516. In one embodiment, the blue alert indication signifies the request for a nurse to deal with a sickness or injury. Appropriate action is taken by the user at this point.

If the alert signal is not BLUE, a determination is made whether the alert code indicates GREEN at step 518. If so, the corresponding selectable alert indicator 202 is illuminated at step 520. In one embodiment, the green alert indication signifies an ALL CLEAR situation. At this point, any local status indicators outside the alert device 122 and within the system 100 are also handled at step 540. Such a local status indicator might include activating an alert indicator 121 to GREEN (or alternatively deactivating an indicator 121 from RED to OFF), for example. Alternatively, other status indicators such as a display at a classroom door are activated or deactivated in some manner.

Once the local status has been updated at step 540, monitoring for received alerts continues at step 542.

If no alert signal is detected at step 502, the alert device 122 checks for user input at step 522 to determine whether the person in possession of the alert device 122 has provided input. Such an input includes selecting one of the selectable alert indicators 202. If there is no user input, any local status indicators are updated if necessary at step 540 and monitoring for received alerts continues at step 542.

Upon receiving a user input at step 522, a determination is made whether a selectable alert indicator 202 corresponding to RED has been selected. In one embodiment, RED for a selectable alert indicator 202 corresponds to a CODE RED situation. The corresponding selectable alert indicator 202 is illuminated upon the user action and a CODE RED alert signal is transmitted at step 526 to the monitoring station 112 and to other alert devices 122 and admin devices 123. Any local status indicators are also updated at this point. In one embodiment, an alert indicator 121 at the door of a classroom is activated to illuminate RED. Monitoring for received alerts continues at step 542.

If the selectable alert indicator 202 does not correspond to CODE RED, a determination is made whether a selectable alert indicator 202 corresponding to ORANGE has been selected. In one embodiment, the selectable alert indicator 202 for ORANGE corresponds to a voice activation initiation. In an alert device 122, the voice activation enables a microphone at step 530, and initiates a request for voice communication at step 532 with an administrator having an admin device 123 or alternatively with someone at the monitoring station 112. In one embodiment, the voice communications are recorded and saved at a server 110 in the monitoring station 112. Monitoring for alerts continues at step 542.

If the selectable alert indicator 202 does not correspond to ORANGE, a determination is made whether a selectable alert indicator 202 corresponding to BLUE has been selected. In one embodiment, the selectable alert indicator 202 for BLUE corresponds to a request for a nurse at step 536. A user might request a nurse via the selectable alert indicator 202 corresponding to BLUE if a child in the classroom is sick, for example. In one such embodiment, an alert indicator 121 at a classroom door is activated to illuminate BLUE so that the nurse can more easily identify the location when within range of the classroom. Monitoring for alerts continues at step 542.

If the selectable alert indicator 202 does not correspond to BLUE, a determination is made whether a selectable alert indicator 202 corresponding to GREEN has been selected. In one embodiment, the selectable alert indicator 202 for GREEN corresponds to an ALL CLEAR situation. In an alert device 122, selection of GREEN for ALL CLEAR transmits an ALL CLEAR alert to the monitoring station and/or the admin device 123 at step 538. Any local status indicators outside the alert device 122 and within the system 100 are handled at step 540. Such a local status indicator might include activating an indicator 121 to illuminate GREEN (or deactivating an indicator 121 from RED to OFF), for example. Once the local status has been updated at step 540, monitoring for received alerts continues at step 542.

The system wide ALL CLEAR is not performed by an alert device, but is initiated by an administrator at the monitoring station 112 or with an admin device 123. In one embodiment, the system wide ALL CLEAR activates all alert indicators 121 to illuminate GREEN. In another embodiment, the system wide ALL CLEAR deactivates all indicators 121 from RED to OFF.

FIG. 6 is a flowchart depicting the operation of the alternative communications alert device 122'. Operation initiates as for an alert device 122 at step 600 and with an added step 602 for determining whether a text input message has been received. If a text input has been received, the contents are displayed on a screen at step 604 and processing otherwise continues as in an alert device 122.

FIG. 7 is a flowchart depicting the operation of an administrative communications alert device (admin device) 123. Operation initiates as for the alert devices 122 at step 700 by monitoring for signals. If an alert signal is received, a determination is made at step 702 whether an alert signal has been received. If so, a determination is made at step 704 whether the alert signal indicates a CODE RED. If so, the corresponding selectable alert indicator 202 is illuminated at step 706 and the user's identity and location are displayed via the admin screen module 210 at step 708.

If the alert is not a CODE RED, a determination is made whether the alert signal indicates ORANGE at step 710. If so, the corresponding selectable alert indicator 202 is illuminated at step 712, the speaker is activated at step 714, and the user's identity and location are displayed via the admin screen module 210 at step 708.

If the alert is not ORANGE, a determination is made whether the alert signal indicates BLUE at step 716. If so, the corresponding selectable alert indicator 202 is illuminated at step 718, and the user's identity and location are displayed via the admin screen module 210 at step 708. A BLUE alert indicates that a nurse has been requested by the corresponding user due to a sickness or injury, whether to the user or to another party. If there is any action required by the administrator in coordination with a nurse being requested, such as, verifying that a nurse has been located and/or that a nurse has responded to the request, then the administrator will take such actions according to procedures at this point, and in response to the alert indicator 121.

If the alert is not BLUE, after having confirmed also that the alert signal is not RED and not ORANGE, then the alert signal is GREEN and is an indication that the user, via an alert device 122, is indicating an ALL CLEAR at their respective location. Each user and corresponding alert device 122 is uniquely identifiable within the system 100. The user identity and location are saved at step 720 and is used in an overall determination for an ALL CLEAR at all locations. At step 722 a determination is made whether an ALL CLEAR has been received from all the alert devices 122. If an ALL CLEAR has been received from every alert device 122, then an ALL CLEAR message is displayed at step 724 and the most recent user and identity are displayed at step 708. Otherwise, the local status is updated at step 726 and monitoring continues at step 728.

If an alert signal is not detected at step 702, a determination is made as to whether there is administrator input at step 730. If so, a determination is made at step 732 whether the alert signal indicates a CODE RED. If so, the corresponding selectable alert indicator 202 is illuminated at step 734 and a CODE RED alert is transmitted to all alert devices 122.

If the alert is not a CODE RED, a determination is made whether the alert signal indicates ORANGE at step 736. If so, an ORANGE selection indicates that the administrator desires to communicate verbally with the corresponding user. If so, the corresponding selectable alert indicator 202 is illuminated and the microphone is activated at step 738. As noted above, each user and each alert device 122 are uniquely identifiable within the system. The particular user is selected at step 740 and the voice activation alert is transmitted to the corresponding alert device 122 at step 742.

If the alert is not ORANGE, a determination is made whether the alert signal indicates BLUE at step 744. If so, the corresponding selectable alert indicator 202 is illuminated and a BLUE alert is transmitted at step 746. A BLUE indicates that a nurse has been requested by the administrator due to a sickness or injury, whether to the administrator or to another party. The administrator takes any necessary actions according to procedures at this point.

In one embodiment, the BLUE alert is transmitted only to those users that are nurses in possession of an alert device 122. Since each alert device 122 is uniquely identifiable, the system 100 transmits the alert to only those alert devices 122 belonging to nurses. In another embodiment, the BLUE alert is transmitted to all alert devices 122. Such a situation is useful in circumstances where not all staff members are necessarily users in possession of an alert device 122. In such an instance, a nearby nurse is identified by a user with an alert device 122 and notified of the need for a nurse. The nurse then contacts an administrator or other necessary personnel for the appropriate course of action and any necessary details.

If the alert is not BLUE, after having confirmed also that the alert signal is not RED and not ORANGE, then the alert signal is GREEN and is an indication of an ALL CLEAR at all locations. Such a step necessarily follows after the administrator's earlier verification via an admin device 123 that ALL CLEAR indicators have been received from all alert devices 122. At step 748 an ALL CLEAR message is transmitted to all users. After transmission of the ALL CLEAR the local status is updated at step 726 and monitoring continues at step 728.

In one embodiment, an exemplary use of an alert device 122 within a specified location embodies a computer-implemented method for coordinated communication within a specified location, the method comprising: activating an alert input of an alert device; upon receiving the alert input at the alert device, determining whether the alert input corresponds to a high priority alert; upon determination that the alert is not high priority, sending an alert signal to a central authority; upon determination that the alert is high priority, further sending an alert signal to a plurality of alert devices, and to at least one administration device; upon receiving the alert signal at an administration device, determining a further action corresponding to a level of alert corresponding to the alert signal.

In another embodiment, an exemplary use of an admin device 123 within a specified location embodies a computer-implemented method for coordinated communication within a specified location, the method comprising: receiving at an administrative alert device, a first alert signal from a specified alert device; upon receiving the first alert input at the alert device, determining whether the alert input corresponds to a high priority alert; upon determination the alert is high priority, sending a high priority alert to all devices throughout the specified location; receiving at an administrative alert device, a second alert signal from the specified alert device; upon receiving the second alert input at the alert device, determining whether the second alert input corresponds to an all clear alert; and upon determination the alert is an all clear alert, sending an all clear alert to all devices throughout the specified location.

In another embodiment, an exemplary use of an admin device 123 within a specified location embodies a further computer-implemented method that comprises upon determination that the alert is not high priority, determining whether the alert is a communication request; and upon determination that the alert is a communication request, enabling a communication channel corresponding to the specified alert device.

In another embodiment, an exemplary use of an admin device 123 within a specified location embodies a further computer-implemented method that comprises upon determination that the alert is not high priority, determining whether the alert is an assistance request; upon determination that the alert is an assistance request, recording and saving a location corresponding to the specified alert device; and providing requested assistance according to a specified procedure corresponding to a type of assistance requested.

From the foregoing description, it will be recognized by those skilled in the art that a coordinated communication system 100 for use in emergency situations has been provided. The system 100 provides for a principal or other authority to transmit information without the need for interruption via a PA or other intrusive system (which in some instances alerts those causing the problem). The system 100 provides for improved accounting for personnel such as students, teachers. The system 100 helps to maintain calmness during tense or disruptive situations. The microphone capability within the alert devices 122, 300, 410, 420 and admin devices 123, 310 provides for voice communication where necessary to provide additional details to an administrator. With forewarning via the system 100, teachers are able to prepare better or to take more effective action without unnecessary panic or commotion.

Additionally, the system 100 provides a more efficient and less disruptive way to handle mundane communications between the administration and teachers within a school, for example. Information collected by the system 100 may be provided, for example, to a school district. The system 100 provides for communications to/from a teacher that is not within the building.

Also, any logic or application described herein, including receiving alerts, sending alerts, determining types of alerts, determining completeness of transmitted or received alerts, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method for providing coordinated communication between on-site campus personnel within a specified location, the method comprising:

receiving, at a monitoring station, a user activation of a non-automated alert at an alert device, the alert device associated with a particular on-site user, the alert device associated with and present within a specified on-site location as determined by location positioning, and the non-automated alert determined at least partially by on-site user input corresponding to on-site user judgment regarding at least one on-site user observed incident, the non-automated alert corresponding to an initial incident within the specified on-site location prior to arrival of any non-associated devices, wherein the monitoring station is integrated with a security system associated with the specified location;

at the alert device associated with the particular on-site user, upon receiving the non-automated alert from the on-site user, utilizing, by the monitoring station, predefined rules to determine whether the non-automated alert corresponds to a high priority condition;

upon determination that the non-automated alert is not high priority, sending, by the monitoring station, an alert signal to a central authority;

upon determination that the non-automated alert is high priority, sending, by the monitoring station, the non-automated alert from the alert device to a plurality of other alert devices each associated with a respective on-site user, each respective alert device being present within the specified on-site location as determined by location positioning, at least one administrative alert device, each at least one administrative alert device associated with a respective on-site administrator user, and each respective administrative alert device being present within the specific on-site location as determined by location positioning, and a first stationary local status indicator of a plurality of local status indicators being visible to an area proximate to the alert device, each stationary local status indicator configured to display an environment status associated with the high priority non-automated alert, each stationary local status indicator being viewable and distinct to any off-site based responder personnel to an area proximate of the on-site user observed incident, wherein all the alert devices and all the stationary local status indicators indicate a high-priority condition until an all clear condition is received;

upon receiving the non-automated alert at the at least one administration alert device within the specified on-site location as determined by location positioning, utilizing, by the monitoring station, a combination of on-site administrator user input and predefined rules to control at least one security action corresponding to a level of alert according to the non-automated alert; wherein the at least one security action comprises controlling access through the security system to specified locations based at least on the location of the non-automated alert at the specified on-site location.

2. A computer-implemented method for providing coordinated communication between on-site campus personnel within a specified location, the method comprising:

receiving, at an administrative alert device associated with a particular on-site administrator user and associated with and present within a specified on-site location as determined by location positioning, a first alert from a specified alert device associated with an on-site remote user, the administrative alert device in communication with a monitoring station, the specified alert device being associated with and present within the specified on-site location as determined by location positioning, the first alert corresponding to a first level of alert determined at least partially by on-site remote user input corresponding to on-site remote user judgment regarding at least one on-site remote user observed incident with the specified on-site location prior to arrival of any non-associated devices, wherein the first alert is wirelessly transmitted to a corresponding stationary local status indicator being visible to an area proximate to the specified alert device, the stationary local status indicator configured to display an environment status associated with the first alert, the stationary local status indicator being viewable to any off-site based responder personnel to an area proximate of the specified alert device associated with the on-site remote user, wherein the monitoring station is integrated with a security system associated with the specified location;

upon receiving the first alert at the administrative alert device within a specified on-site location as determined by location positioning, utilizing, by the monitoring station, a combination of administrator input and predefined rules to determine whether the first alert is high priority and control at least one security action corresponding to the first level of alert; wherein the at least one security action comprises controlling access through the security system to specified locations based at least on the location of the first alert at the specified on-site location;

upon determination at the administrative alert device that the first alert is high priority, sending, by the monitoring station, a high priority alert to all alert devices throughout the specified location;

receiving at the administrative alert device associated with the particular on-site administrator user, a second alert from the specified alert device associated with the on-site remote user, the second alert corresponding to a second level of alert determined at least partially by on-site remote user input corresponding to the at least one on-site remote user observed incident;

upon receiving the second alert at the administrative alert device, utilizing, by the monitoring station, a combination of administrator input and predefined rules to determine whether the second alert is an all clear condition; and upon determination the second alert is an all clear condition, sending, by the monitoring station, an all clear alert to all alert devices and to all stationary local status indicators throughout the specified location.

3. The computer-implemented method of claim 2, further comprising upon determination that the first alert is not high priority, determining whether the first alert is a communication request; and upon determination that the first alert is a communication request, enabling a communication channel corresponding to the specified alert device.

4. The computer-implemented method of claim 2, further comprising upon determination that the first alert is not high priority, determining whether the first alert is an assistance request;

upon determination that the first alert is an assistance request, recording and saving a location corresponding to the specified alert device; and providing requested assistance according to a specified procedure corresponding to a type of assistance requested.

5. The computer-implemented method of claim 2, further comprising:

upon determination that the first alert is not high priority, determining whether the first alert is an updated environment status; and upon determination that the first alert is an updated environment status, transmitting the updated environment status to at least one alert device.

6. A system for coordinated communication between on-site campus personnel within a specified on-site location, the system comprising:

a monitoring station for coordinating alerts corresponding to an environment status among wireless network devices being within the specified on-site location as determined by location positioning, the environment status determined at least partially by on-site user personnel alert inputs corresponding to on-site user judgment regarding at least one on-site user observed incident within the specified on-site location prior to arrival of any off-site based responder personnel, the monitoring station configured to integrate with a security system associated with the specified location, wirelessly transmit at least one alert, wirelessly receive at least one updated alert that specifies an updated environment status, wirelessly update the environment status among the network devices according to the at least one updated alert, and utilize a combination of on-site administrator user input and predefined rules to control at least one security action corresponding to a level of alert according to the at least one alert, wherein the at least one security action comprises controlling access through the security system to specified locations based at least on a location of the at least one alert at the specified on-site location;

a plurality of alert devices being within the specified on-site location as determined by location positioning, each alert device associated with a particular user, each alert device further configured to wirelessly receive the at least one alert, each alert device further including a plurality of selectable alert indicators to display the environment status corresponding to the at least one updated alert, and each selectable alert indicator further configured for receiving an input from the particular user to provide a new alert, and each alert device further configured to wirelessly transmit the new alert to the monitoring station;

a plurality of stationary local status indicators being within the specified on-site location, each stationary local status indicator configured to wirelessly receive the at least one alert and to display a corresponding environment status, each stationary local status indicator associated with a particular alert device of the plurality of alert devices, each stationary local status indicator being viewable and distinct to any off-site based responder personnel to an area proximate to the particular alert device of a corresponding stationary local status indicator; and at least one administrative alert device, each administrative alert device associated with a particular on-site administrator user, each administrative alert device being within a specified on-site location as determined by local positioning, each administrative alert device configurable to wirelessly receive the at least one alert, each administrative alert device further including a plurality of selectable alert indicators to display the environment status corresponding to the at least one updated alert, and each selectable alert indicator further configured for receiving an administrator input, and each administrative alert device further configured to utilize a combination of the administrator input and predetermined rules to determine a new environment status and to wirelessly transmit the new environment status to the monitoring station, to the alert devices, and to the plurality of stationary local status indicators, whereby each alert device and each administrative alert device provide new alerts according to the environment status of an area proximate of the respective device, and whereby each administrative alert device further provides for updating the environment status of the specified on-site location that includes each area proximate to each alert device.

7. The system of claim 6, wherein the network devices include at least one of the following:

a selectable alert indicator;

an alert device; and an administrative alert device.

8. The system of claim 7, wherein wirelessly updating the environment status applies to one or more of the network devices.

9. The system of claim 6, wherein each stationary local status indicator is located remotely from at least one alert device and at least one administrative alert device.

10. The system of claim 9, wherein each stationary local status indicator is one of the following:

a color coded light;

an LED display; and an e-paper display.

11. The system of claim 6, wherein the selectable alert indicators include at least one of the following:

a button;

an illuminable button;

a touch screen device;

a buzzer; and a pull-ring.

12. The system of claim 6, wherein the environment status is displayed on at least one stationary local status indicator of the plurality of stationary local status indicators until a new environment status is received at the at least one stationary local status indicator.

13. The system of claim 6, wherein each alert device is further configured to transmit the new alert to at least one administrative alert device.

14. The system of claim 6, wherein each alert device is further configured to transmit the new alert to at least one stationary local status indicator.

15. The system of claim 6, wherein each alert device and each administrative alert device are uniquely identifiable within the system.

16. The system of claim 6, wherein the monitoring station further provides a text communication channel between the monitoring station and one of the following:

an alert device; and an administrative alert device.

17. The system of claim 6, wherein each administrative alert device includes a text module for text communication.

18. The system of claim 6, wherein each alert device includes a text module for receiving text communications.

19. The system of claim 6, wherein the monitoring station further provides a voice communication channel between the monitoring station and one of the following:

an alert device; and an administrative alert device.

20. The system of claim 19, wherein the monitoring station further provides a voice communication channel between an administrative alert device and one of the following:

an alert device; and another administrative alert device.

* * * * *